United States Patent
Wu et al.

(10) Patent No.: US 8,693,356 B2
(45) Date of Patent: Apr. 8, 2014

(54) METHOD FOR WIRELESS COMMUNICATION SYSTEM AND DEVICE USING THE SAME

(75) Inventors: Cheng-Hsuan Wu, Taipei (TW); Yen-Chin Liao, Taipei (TW); Yung-Szu Tu, Taipei (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 473 days.

(21) Appl. No.: 12/834,876

(22) Filed: Jul. 12, 2010

(65) Prior Publication Data
US 2011/0013532 A1  Jan. 20, 2011

Related U.S. Application Data

(60) Provisional application No. 61/225,931, filed on Jul. 16, 2009.

(30) Foreign Application Priority Data

Dec. 1, 2009 (TW) ................... 98141061 A

(51) Int. Cl.
*G01R 31/08* (2006.01)
(52) U.S. Cl.
USPC ............................ 370/252; 370/338; 375/260
(58) Field of Classification Search
USPC ............... 370/310, 312, 328–338, 474, 476; 375/260
See application file for complete search history.

(56) References Cited

U.S. PATENT DOCUMENTS

| | | |
|---|---|---|
| 5,999,570 A | 12/1999 | Chaki |
| 2002/0181546 A1 | 12/2002 | Odenwalder |
| 2004/0114691 A1 | 6/2004 | Kim |
| 2005/0003769 A1 | 1/2005 | Foerster |
| 2005/0276347 A1 | 12/2005 | Mujtaba |
| 2006/0007898 A1 | 1/2006 | Maltsev |
| 2006/0140303 A1 | 6/2006 | Egashira |
| 2006/0182017 A1 | 8/2006 | Hansen |

(Continued)

FOREIGN PATENT DOCUMENTS

| | | |
|---|---|---|
| TW | I300657 | 9/2008 |
| TW | 201105071 | 2/2011 |
| TW | 201105073 | 2/2011 |

OTHER PUBLICATIONS

Seongkwan Kim et al., "A High-Throughput MAC Strategy for Next-Generation WLANs", Proceedings of the Sixth IEEE Internationl Symposium on a World of Wireless Mobile and Multimedia Networks (WoWMoM'05), 2005 IEEE, p. 278-285, Jun. 13, 2005.

(Continued)

*Primary Examiner* — Ricky Ngo
*Assistant Examiner* — Iqbal Zaidi
(74) *Attorney, Agent, or Firm* — Winston Hsu; Scott Margo

(57) ABSTRACT

A method, for determining a first amount of a plurality of high-throughput long training fields within a packet in a wireless communication system, includes determining a second amount of a plurality of space time streams needed by the wireless communication system transmitting the packet, and setting the first amount to be greater than or equal to 8 when the second amount is greater than 4.

10 Claims, 6 Drawing Sheets

(56) References Cited

U.S. PATENT DOCUMENTS

| | | |
|---|---|---|
| 2006/0245472 A1 | 11/2006 | Pan |
| 2006/0251183 A1 | 11/2006 | Soffer |
| 2007/0047666 A1 | 3/2007 | Trachewsky |
| 2007/0133728 A1 | 6/2007 | Bahng |
| 2007/0147414 A1 | 6/2007 | Niu |
| 2007/0230373 A1 | 10/2007 | Li |
| 2007/0230600 A1 | 10/2007 | Bertrand |
| 2008/0075158 A1 | 3/2008 | Li |
| 2008/0101306 A1 | 5/2008 | Bertrand |
| 2008/0108456 A1 | 5/2008 | Bonito |
| 2008/0303701 A1 | 12/2008 | Zhang |
| 2009/0225727 A1 | 9/2009 | Chen |
| 2009/0304104 A1 | 12/2009 | Le Saux |
| 2010/0046656 A1 | 2/2010 | van Nee |
| 2010/0111065 A1 | 5/2010 | Noh |
| 2010/0239038 A1 | 9/2010 | Seyedi-Esfahani |
| 2010/0260159 A1* | 10/2010 | Zhang et al. ............... 370/338 |
| 2010/0290449 A1 | 11/2010 | van Nee |
| 2010/0309834 A1* | 12/2010 | Fischer et al. ............. 370/312 |
| 2011/0013547 A1 | 1/2011 | Liao |
| 2011/0013583 A1 | 1/2011 | Yang |
| 2011/0013721 A1 | 1/2011 | Liao |

OTHER PUBLICATIONS

W. A. Syafei, Y. Nagao, R. Imashioya, M. Kurosaki, B. Sai, and H. Ochi, "Design of 600 Mbps MIMO Wireless LAN System using GLST Coding and Its FPGA Implementation", IEEE, Radio and Wireless Symposium, Jan. 18-22, 2009, pp. 296-299.

* cited by examiner

| $N_{STS}$ | $N_{DLTF}$ |
|---|---|
| 1 | 1 |
| 2 | 2 |
| 3 | 4 |
| 4 | 4 |

FIG. 2 PRIOR ART

| $N_{STS}$ | $N_{DLTF}$ |
|---|---|
| 1 | 1 |
| 2 | 2 |
| 3 | 4 |
| 4 | 4 |
| 5 | 8 |
| 6 | 8 |
| 7 | 8 |
| 8 | 8 |

FIG. 5

METHOD FOR WIRELESS COMMUNICATION SYSTEM AND DEVICE USING THE SAME

CROSS REFERENCE TO RELATED APPLICATIONS

This application claims the benefit of U.S. Provisional Application No. 61/225,931, filed on Jul. 16, 2009 and entitled "WIRELESS TRANSMISSION METHOD AND DEVICE USING THE SAME", the contents of which are incorporated herein.

BACKGROUND OF THE INVENTION

1. Field of the Invention

The present invention relates to a method and device for a wireless communication, and more particularly, to a method and device capable of ensuring operations of a channel estimation of a very high throughput (VHT) wireless local area network (WLAN).

2. Description of the Prior Art

Wireless local area network (WLAN) technology is one of popular wireless communication technologies, which is developed for military use in the beginning and is widely applied in consumer electronics in recent years, e.g. desktop computers, laptop computers, personal digital assistants, etc., to provide convenient and high-speed internet communication media for the masses. IEEE 802.11 is a set of WLAN protocols developed by the Institute of Electrical and Electronics Engineers, evolved from the former IEEE 802.11a/b/g standards to the current mainstream IEEE 802.11n standard. IEEE 802.11a/g/n standards adopt orthogonal frequency division multiplexing (OFDM) technique. Different to IEEE 802.11a/g standard, IEEE 802.11n standard further applies a multiple-input multiple-output (MIMO) technique and other features, and greatly enhances data rate and throughput. In addition, in IEEE 802.11n standard, the channel bandwidth is doubled from 20 MHz to 40 MHz.

Please refer to FIG. 1, which is a schematic diagram of a conventional IEEE 802.11n packet. As shown in FIG. 1, the IEEE 802.11n packet consists of a preamble portion carrying preamble data and a payload portion carrying data to be transmitted. The preamble data is of a mixed format, is backward compatible with IEEE 802.11a/g standard devices, and includes, in sequence, legacy short training field L-STF, legacy long training field L-LTF, legacy signal field L-SIG, high-throughput signal field HT-SIG, high-throughput short training field HT-STF, and N pieces of high-throughput long training fields HT-LTF. The legacy short training field L-STF is used for start-of-packet detection, automatic gain control (AGC), initial frequency offset estimation, and initial time synchronization. The legacy long training field L-LTF is used for further fine frequency offset estimation and time synchronization. The legacy signal field L-SIG carries information of data rate and packet length. The high-throughput signal field HT-SIG also carries data rate information, and is used for packet detection, so that the mixed format or the legacy format the transmitted packet uses can be detected. The high-throughput short training field HT-STF is used for automatic gain control. The high-throughput long training fields HT-LTF are used for MIMO channel detection, enabling receivers to determine channel status accordingly.

Patterns of the high-throughput long training fields HT-LTF are well-known for those skilled in the art, and are not narrated herein. Functionally, the high-throughput long training fields HT-LTF can be further divided in two categories. The first category refers to data high-throughput long training fields, for estimating a channel status used by current data, with a quantity $N_{DLTF}$ determined by a quantity $N_{STS}$ of space time streams, as illustrated in FIG. 2. The second catalog refers to extension high-throughput long training fields, for detecting extra spatial dimensions of channels not in use, with a quantity $N_{ELTF}$ determined by a quantity $N_{ESS}$ of extra spatial dimensions to be detected. A reference table of $N_{ELTF}$ and $N_{ESS}$ is identical to that of $N_{DLTF}$ and $N_{STS}$ as illustrated in FIG. 2. In addition, IEEE 802.11n standard supports upmost four antennas, and hence, $N_{DLTF}$ and $N_{ELTF}$ are smaller or equal to 4.

On the other hand, in order to reduce the complexity of channel estimation, the high-throughput long training fields HT-LTF are designed to be generated by giving weightings and delays to a single symbol in the prior art. Therefore, as illustrated in FIG. 3, aimed at different transmission routes (TX1-TX4), a transmission terminal passes the high-throughput long training fields HT-LTF through a spreading code matrix, to determine adequate weightings in channel estimation, performs a cyclic shift delay (CSD) execution to add cyclic prefixes for resisting multi-path interference, performs a spatial mapping execution, such as beamforming, for enhancing SNR, and finally, performs an inverse discrete Fourier transform to realize OFDM, transforming input sequences of frequency domain into OFDM symbol sequences of time domain. The spreading code matrix is a 4×4 matrix $P_{4\times 4}$:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

To achieve WLAN transmission with much higher quality, the IEEE committee is developing new WLAN standards, such as IEEE 802.11ac standard, which has features of very high throughput (VHT), increased channel bandwidth from 40 MHz to 80 MHz, and supporting more than four antennas. In other words, the quantity $N_{STS}$ of space time streams (or the quantity $N_{ESS}$ of extra spatial dimensions to be detected) may exceed 4, i.e. exceed the situation defined in FIG. 2. As a result, the quantity $N_{DLTF}$ of data high-throughput long training fields (or the quantity $N_{ELTF}$ of extension high-throughput long training fields) cannot be accurately decided, and the spreading code matrix cannot be decided at the same time.

Therefore, it is necessary to determine the quantity $N_{DLTF}$ of data high-throughput long training fields (or the quantity $N_{ELTF}$ of extension high-throughput long training fields) when the quantity $N_{STS}$ of space time streams (or the quantity $N_{ESS}$ of extra spatial dimensions to be detected) is greater than 4, to facilitate the realization of the next generation WLAN standard.

SUMMARY OF THE INVENTION

It is therefore a primary objective of the claimed invention to provide a setting method and device for a wireless communication.

The present invention discloses a method, for determining a first amount of a plurality of high-throughput long training fields within a packet in a wireless communication system, including determining a second amount of a plurality of space time streams needed by the wireless communication system transmitting the packet, and setting the first amount to be greater than or equal to 8 when the second amount is greater than 4.

The present invention further discloses a wireless communication device, for transmitting a packet having a first amount of a plurality of high-throughput long training fields, including a microprocessor and a memory, for storing a program, for instructing the microprocessor to execute the following steps: determining a second amount of a plurality of space time streams for transmitting the packet, and setting the first amount to be greater than or equal to 8 when the second amount is greater than 4.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram of a reference table for determining a quantity of high-throughput long training fields according to the IEEE 802.11n standard.

FIG. 5 is a schematic diagram of a reference table for determining a quantity of high-throughput long training fields according to an embodiment of the present invention.

DETAILED DESCRIPTION

Figure 1:
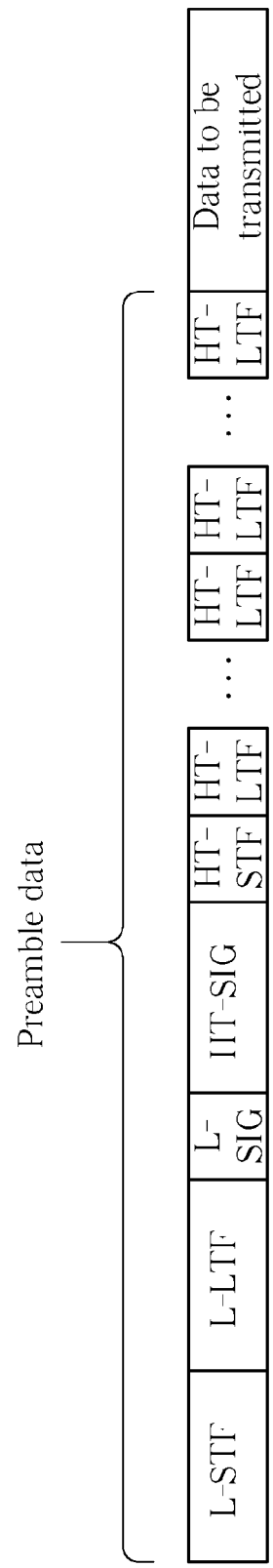
FIG. 1 is a schematic diagram of a conventional IEEE 802.11n packet.
Figure 3:
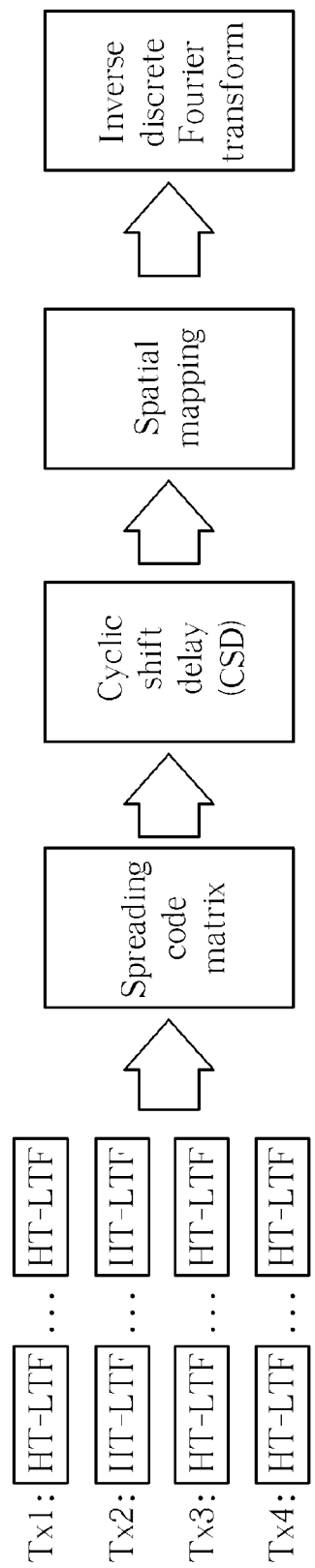
FIG. 3 is a schematic diagram of a process for handling high-throughput long training fields according to the IEEE 802.11n standard.
Figure 4:
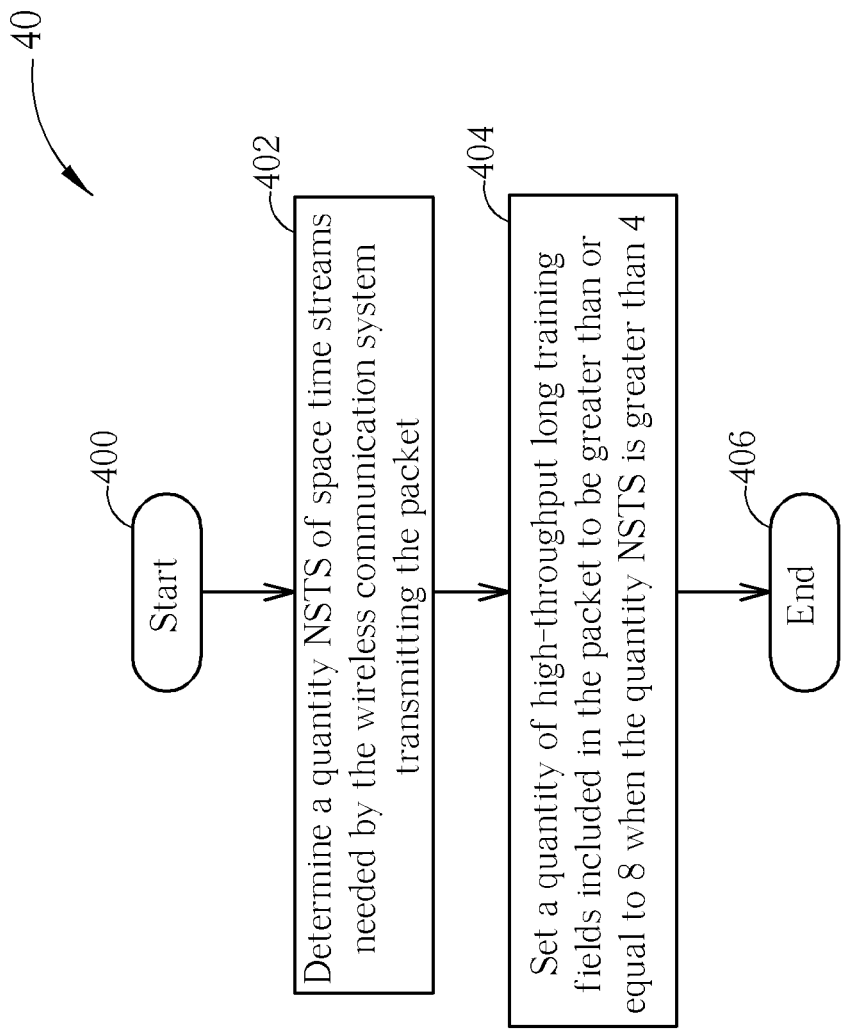
FIG. 4 is a schematic diagram of a setting process according to an embodiment of the present invention.

Please refer to FIG. 4. FIG. 4 is a schematic diagram of a setting process 40 according to an embodiment of the present invention. The setting process 40 is utilized for determining the quantity of high-throughput long training fields included in a packet in a wireless communication system. The wireless communication system preferably conforms to IEEE 802.11 WLAN standard. The setting process 40 comprises the following steps:

Step 400: Start.

Step 402: Determine a quantity $N_{STS}$ of space time streams needed by the wireless communication system transmitting the packet.

Step 404: Set a quantity of high-throughput long training fields included in the packet to be greater than or equal to 8 when the quantity $N_{STS}$ is greater than 4.

Step 406: End.

According to the setting process 40, when the quantity $N_{STS}$ of space time streams is greater than 4, the present invention sets the quantity of high-throughput long training fields to be greater than 8. In detail, the high-throughput long training fields specified herein are the data high-throughput long training fields, in other words, the above relation can be represented in the following equation:

$N_{DLTF} \geq 8, \forall N_{STS} > 4$.

When the quantity $N_{DLTF}$ of data high-throughput long training fields is determined, the spreading code matrix can be further determined, to determine the adequate weightings in channel estimation. Note that, the spreading code matrix is utilized for transforming the high-throughput long training fields, to set the weightings in channel estimation; thus, the detailed content may vary with system requirements. In general, for decreasing operating complexity, the present invention preferably set each element of the spreading code matrix to 1 or −1, and set a transpose matrix of the spreading code matrix to be equal to an inverse matrix of the spreading code matrix. As a result, the inverse matrix can be obtained by exchanging rows and columns of the spreading code matrix, such that the complexity of the whole operations can be degraded. Accordingly, the result of the above equation can be obtained via the mighty operation ability of computer systems.

Figure 2:
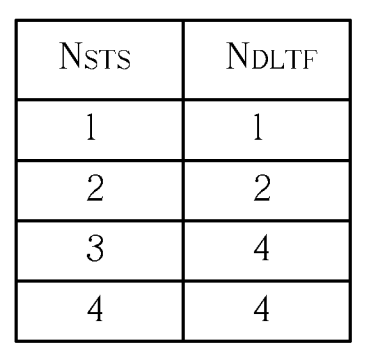
Figure 5:
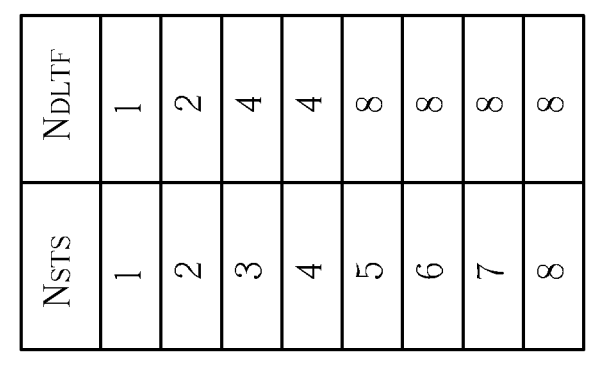

Furthermore, the relation between the quantity $N_{DLTF}$ and the quantity $N_{STS}$ shown in FIG. 2 can be expanded to a table shown in FIG. 5, i.e. when the quantity $N_{STS}$ of space time streams is 5, 6, 7, or 8, the quantity $N_{DLTF}$ of data high-throughput long training fields is 8. In addition, regarding the continuity of technology, the original spreading code matrix $P_{4\times4}$ of $N_{DLTF}=4$ can further be used when designing spreading code matrixes of $N_{DLTF} \geq 8$, such as:

$$Pa_{8\times 8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ -1 & -1 & -1 & 1 & -1 & 1 & 1 & -1 \end{bmatrix}.$$

By dividing the spreading code matrix $Pa_{8\times 8}$ to four 4×4 matrixes, i.e. $\begin{bmatrix} P11 & P12 \\ P21 & P22 \end{bmatrix}$, it can be seen that the left-top 4×4 matrix (P11) and the right-top 4×4 matrix (P12) are identical to the spreading code matrix $P_{4\times 4}$. Furthermore, applying linear operations by units of rows to the left-bottom matrix (P21) and the right-bottom matrix (P22) can obtain:

$$Pb_{8\times 8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix}.$$

The left-top 4×4 matrix, the right-top 4×4 matrix, and the left-bottom 4×4 matrix of the spreading code matrix $Pb_{8\times 8}$ are all identical to the spreading code matrix $P_{4\times 4}$.

Note that, the spreading code matrix $Pa_{8\times 8}$ and $Pb_{8\times 8}$ are two possible embodiments of the 8×8 spreading code matrix, but not the limitation. Meanwhile, the essence of the present invention is to determine the quantity of the high-throughput long training fields. Once the quantity of the high-throughput long training fields is decided, the dimensions of the corresponding spreading code matrix can be determined, and those skilled in the art can further obtain an adequate spreading code matrix according to different requirement.

Figure 6:
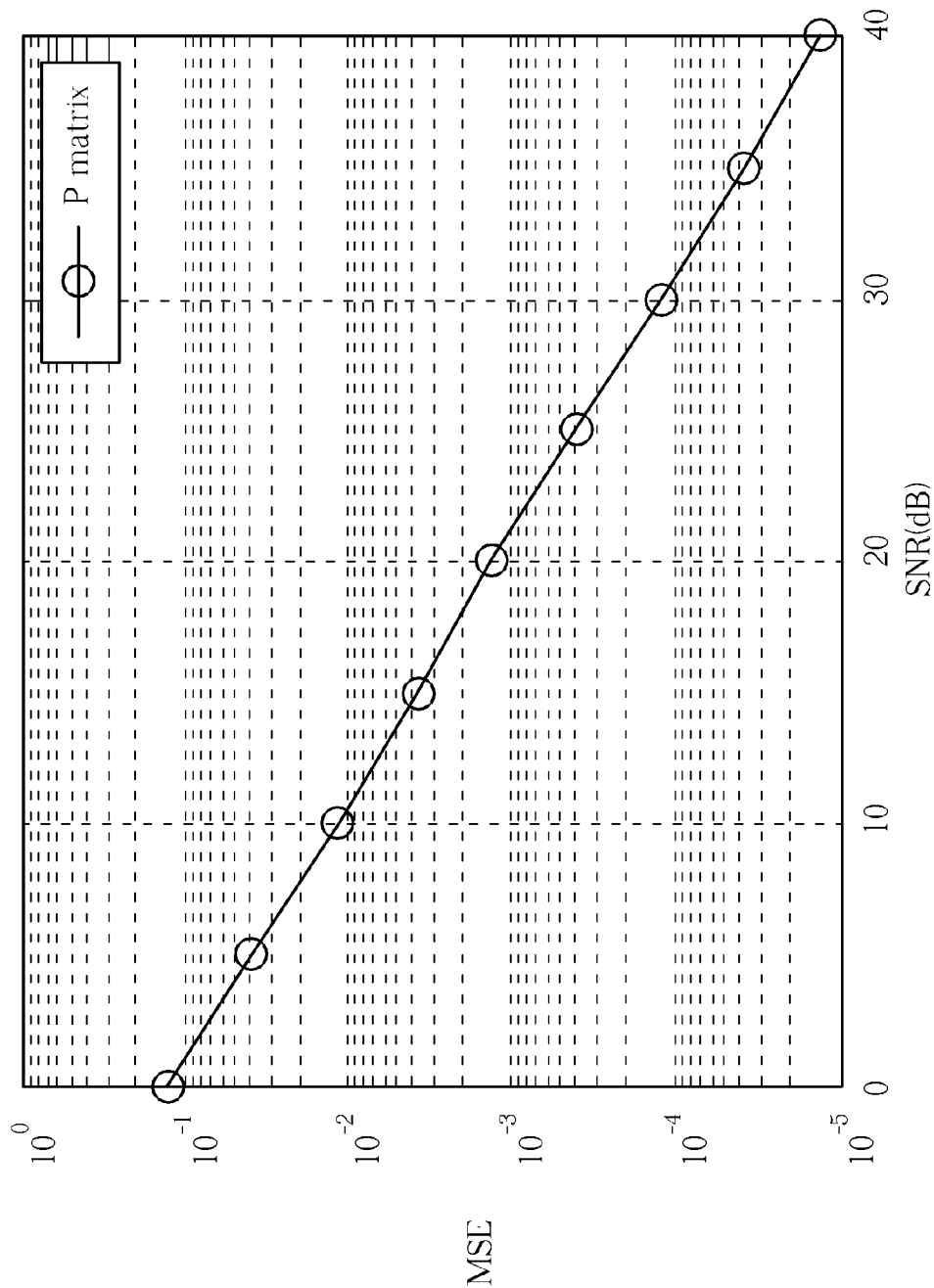
FIG. 6 is a schematic diagram of a channel estimation result according to an embodiment of the present invention.

For evaluate the above method, a simulation result in FIG. 6 can be obtained via an adequate simulation method, which represents a channel estimation result of a 6T2R (6 transmission and 2 receiving) system. In FIG. 6, an x axis denotes signal to noise ratio (SNR), while a y axis denotes mean square error (MSE).

When the quantity $N_{STS}$ of space time streams is greater than 4, the present invention sets the quantity of high-throughput long training fields to be greater than 8, which can further be derived to "when the quantity $N_{ESS}$ of extra spatial dimensions to be detected is greater than 4, the quantity $N_{ELTF}$ of extension high-throughput long training field is set to be greater than 8." Such derivation is well-known for those skilled in the art.

On the other hand, as to hardware realization, the setting process 40 can be transformed to a program with a format of software or firmware, and stored in a memory of a wireless communication device, for instructing a microprocessor to execute the steps of the setting process 40. Transforming the setting process 40 into an adequate program to realize a corresponding setting device should be an ordinary skill in the art.

As mentioned in the above, the prior art merely defines the quantity $N_{DLTF}$ of data high-throughput long training fields (or the quantity $N_{ELTF}$ of extension high-throughput long training fields) when the quantity $N_{STS}$ of space time streams (or the quantity $N_{ESS}$ of extra spatial dimensions to be detected) is smaller than or equal to 4. Therefore, when the quantity $N_{STS}$ of space time streams is greater than 4, the prior art can neither decide the quantity of the high-throughput long training fields, nor decide the spreading code matrix. In comparison, when the quantity $N_{STS}$ of space time streams is greater than 4, the present invention sets the quantity of high-throughput long training fields to be greater than 8, or more specifically, when the quantity $N_{STS}$ of space time streams is 5, 6, 7, or 8, the quantity $N_{DLTF}$ of data high-throughput long training fields is set to 8. Thus, the spreading code matrix can be further decided.

To sum up, when the quantity of space time streams is greater than 4, the present invention sets the quantity of high-throughput long training fields to be greater than 8, for ensuring the normal operations of channel estimation in the very high throughput (VHT) wireless local area network (WLAN).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a first amount of a plurality of high-throughput long training fields within a packet in a wireless communication system, comprising:
   determining a second amount of a plurality of space time streams needed by the wireless communication system transmitting the packet;
   setting the first amount to be equal to 8 for at least two different values of the second amount of the plurality of space time streams when the second amount equals any integer selected from 5 to 8; and
   setting a spreading code matrix P, for transforming the plurality of high-throughput long training field by the wireless communication system, to be:

$$P = \begin{bmatrix} P11 & P12 \\ P21 & P22 \end{bmatrix};$$

wherein P11, P12, P21, and P22 are 4×4 matrixes, respectively.

2. The method of claim 1, wherein P11 is a spreading code matrix for transforming the plurality of high-throughput long training field by the wireless communication system, when the second amount is smaller than or equal to 4.

3. The method of claim 2, wherein $$P11 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P12 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P21 = \begin{bmatrix} 1 & 1 & 1 & 1 \\ 1 & -1 & 1 & -1 \\ 1 & 1 & -1 & -1 \\ -1 & -1 & -1 & 1 \end{bmatrix}; \text{ and}$$

$$P22 = \begin{bmatrix} -1 & -1 & -1 & -1 \\ -1 & 1 & -1 & 1 \\ -1 & -1 & 1 & 1 \\ -1 & 1 & 1 & -1 \end{bmatrix}.$$

4. The method of claim 2, wherein $$P11 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P12 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P21 = \begin{bmatrix} 1 & -1 & 1 & 1 \\ 1 & 1 & -1 & 1 \\ 1 & 1 & 1 & -1 \\ -1 & 1 & 1 & 1 \end{bmatrix}; \text{ and}$$

$$P22 = \begin{bmatrix} -1 & 1 & -1 & -1 \\ -1 & -1 & 1 & -1 \\ -1 & -1 & -1 & 1 \\ 1 & -1 & -1 & -1 \end{bmatrix}.$$

5. The method of claim 2, wherein P21 and P22 are capable of undergoing linear operations by a unit of a row.

6. A wireless communication device, for transmitting a packet having a first amount of a plurality of high-throughput long training fields, comprising:
   a microprocessor; and
   a memory, for storing a program for instructing the microprocessor to execute the following steps:

determining a second amount of a plurality of space time streams for transmitting the packet;
setting the first amount to be equal to 8 for at least two different values of the second amount of the plurality of space time streams when the second amount equals any integer selected from 5 to 8; and
setting a spreading code matrix P, for transforming the plurality of high-throughput long training field, to be:

$$P = \begin{bmatrix} P11 & P12 \\ P21 & P22 \end{bmatrix};$$

wherein P11, P12, P21, and P22 are 4×4 matrixes, respectively.

7. The wireless communication device of claim 6, wherein P11 is a spreading code matrix for transforming the plurality of high-throughput long training field, when the second amount is smaller than or equal to 4.

8. The wireless communication device of claim 7, wherein $$P11 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P12 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P21 = \begin{bmatrix} 1 & 1 & 1 & 1 \\ 1 & -1 & 1 & -1 \\ 1 & 1 & -1 & -1 \\ -1 & -1 & -1 & 1 \end{bmatrix}; \text{ and}$$

$$P22 = \begin{bmatrix} -1 & -1 & -1 & -1 \\ -1 & 1 & -1 & 1 \\ -1 & -1 & 1 & 1 \\ -1 & 1 & 1 & -1 \end{bmatrix}.$$

9. The wireless communication device of claim 7, wherein $$P11 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P12 = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P21 = \begin{bmatrix} 1 & -1 & 1 & 1 \\ 1 & 1 & -1 & 1 \\ 1 & 1 & 1 & -1 \\ -1 & 1 & 1 & 1 \end{bmatrix}; \text{ and}$$

$$P22 = \begin{bmatrix} -1 & 1 & -1 & -1 \\ -1 & -1 & 1 & -1 \\ -1 & -1 & -1 & 1 \\ 1 & -1 & -1 & -1 \end{bmatrix}.$$

10. The wireless communication device of claim 7, wherein P21 and P22 are capable of undergoing linear operations by a unit of a row.

* * * * *